United States Patent
Moogi et al.

(10) Patent No.: US 9,693,272 B2
(45) Date of Patent: Jun. 27, 2017

(54) NEIGHBOUR CELL MEASUREMENTS

(71) Applicant: Optis Circuit Technology, LLC, Plano, TX (US)

(72) Inventors: Suyog Moogi, Bangalore (IN); Sreelakshmi Gollapudi, Bangalore (IN); Pankaj Jaiswal, Bangalore (IN)

(73) Assignee: Optis Circuit Technology, LLC, Plano, TX (US)

( * ) Notice: Subject to any disclaimer, the term of this patent is extended or adjusted under 35 U.S.C. 154(b) by 103 days.

(21) Appl. No.: 14/438,949

(22) PCT Filed: Nov. 28, 2013

(86) PCT No.: PCT/EP2013/074960
§ 371 (c)(1),
(2) Date: Apr. 28, 2015

(87) PCT Pub. No.: WO2014/083100
PCT Pub. Date: Jun. 5, 2014

(65) Prior Publication Data
US 2015/0304910 A1    Oct. 22, 2015

Related U.S. Application Data

(60) Provisional application No. 61/731,813, filed on Nov. 30, 2012.

(30) Foreign Application Priority Data

Nov. 29, 2012 (EP) .................................... 12194797

(51) Int. Cl.
*H04W 36/00*    (2009.01)
*H04W 24/10*    (2009.01)
*H04W 76/04*    (2009.01)

(52) U.S. Cl.
CPC ....... *H04W 36/0088* (2013.01); *H04W 24/10* (2013.01); *H04W 76/048* (2013.01)

(58) Field of Classification Search
CPC  H04W 36/0088; H04W 24/10; H04W 76/048
(Continued)

(56) References Cited

U.S. PATENT DOCUMENTS

2007/0037601 A1   2/2007  Mittal et al.
2009/0180435 A1*  7/2009  Sarkar .................. H04L 5/14
                                         370/330

(Continued)

FOREIGN PATENT DOCUMENTS

WO   2011/090496 A1   7/2011
WO   2012/087360 A1   6/2012

OTHER PUBLICATIONS

International Search Report issued in corresponding International application No. PCT/EP2013/074960, date of mailing of the report Jan. 29, 2014.
Extended European Search Report issued in corresponding European patent application No. EP 12 19 4797, date of completion of the search Apr. 24, 2013.

*Primary Examiner* — Marcus Hammonds
(74) *Attorney, Agent, or Firm* — Spencer C. Patterson; Grable Martin Fulton PLLC (57) ABSTRACT

An efficient way is described for a user equipment, camping on a cell of a first radio access technology, RAT, to perform measurements on the transmissions from a neighboring radio cell of a different RAT. Recurrent time gaps that are available for making the measurements are not correlated or synchronized with the recurrent times at which the desired information are transmitted by the transmitter in the second RAT. Therefore, mapping is performed of the time gaps onto the interval at which the desired information is transmitted. The mapping continues until a time interval is covered that ensures that the information in the recurring desired block of (Continued)

information can be obtained. During the mapping of the measurement gaps, only those time intervals that have not already been covered by the mapping are used for obtaining the desired information.

19 Claims, 9 Drawing Sheets

(58) Field of Classification Search
USPC .................. 455/434, 436, 450–454; 370/329
See application file for complete search history.

(56) References Cited

U.S. PATENT DOCUMENTS

| | | | |
|---|---|---|---|
| 2010/0034158 A1* | 2/2010 | Meylan | H04L 1/1854 370/329 |
| 2010/0074218 A1* | 3/2010 | Cai | H04W 36/0083 370/331 |
| 2012/0163346 A1* | 6/2012 | Chin | H04W 36/0088 370/335 |

* cited by examiner

NEIGHBOUR CELL MEASUREMENTS

TECHNICAL FIELD

The field of the present disclosure is that of measuring signals in an environment with radio cells belonging to different cellular radio access technologies.

BACKGROUND

In current mobile communication devices, such as mobile telephones, an important feature is that of being able to communicate in different communication networks. That is, the hardware and software of the devices need to support multiple radio access technologies, such as the third generation partnership project, 3GPP, Global System for Mobile Communications, GSM, Wideband Code Division Multiple Access, WCDMA, Long Term Evolution, LTE and the Chinese Time Division Synchronous Code Division Multiple Access, TD-SCDMA, systems. A consequence of this is that neighbor cell measurements have to be done across all the supported radio access technologies. Neighbor cell measurement is a procedure that takes place when a mobile communication device is camped on a cell (i.e. in connection with a radio base station that maintains a radio cell) using a particular radio access technology (WCDMA for instance) and is in a connected mode, it needs to create time gaps in its radio signal reception process, in order to create measurement occasions for neighbor cells (i.e. cells that are geographically adjacent or even overlapping the cell on which the mobile communication device is camped) which belong to other radio access technologies like LTE or GSM. These measurement occasions (or gaps) have to be shared (i.e. gaps created by one RAT is a common resource to be used to measure neighbor cells of all other RATs) such that measurement reporting deadlines are met for all the cells in the neighbor cell list of the mobile.

When a mobile is camped on a WCDMA cell, then the measurement gaps are created and published (i.e. made available for sharing) by controlling entities in the network with a specific purpose. For example, a gap needs to be used for GSM received signal strength indicator, RSSI, measurements or base station identity code, BSIC, Identification or BSIC Reconfirmation). In such a situation, the mobile communication device has to just use the measurement gaps with the purpose specified by the network and it is expected that measurement reporting deadlines will be met. But, when the mobile is camped on an LTE cell, the measurement gaps are published without any specific purpose. So the mobile phone needs to implement logic to effectively use the published gaps such that all its measurement deadlines are met.

Moreover, LTE also has a discontinuous reception, DRX, and a non DRX mode of operation for saving power drained from the power source of the device. The deadline for sending the periodic measurement reports to the LTE network is different for the two modes. The mobile communication device can alternate between the DRX and non DRX modes very dynamically and, as a consequence of this, the deadline becomes ambiguous. Furthermore, GSM being a time division multiple access, TDMA, based system, the measurements like BSIC reconfirmations have to be done at specific instances and a measurement gap at any instance is therefore not useful. For BSIC identification the timing of the cell is unknown and a continuous time of 97 GSM slots (or 57 milliseconds) is needed for a guaranteed detection of a signal that carries the BSIC. But since measurement gaps published by LTE cells are much shorter duration (in fact the duration of the LTE gaps are 6 milliseconds) the detection becomes unpredictable.

SUMMARY

In order to mitigate at least some of the drawbacks as discussed above, there is provided in a first aspect a method in a user equipment, UE. The UE is connected to a first radio access network, RAN and the method is for obtaining a block of information, FS, transmitted by a transmitter in a second RAN, to which second RAN the UE is not connected. The FS has a duration DTFS and is repeatedly transmitted every T1 time units and an idle block having a duration DTID is transmitted every T2 time units, where T2 is greater than T1. The method comprises a repeated mapping process of:

obtaining timing information for a measurement interval that specifies a point in time, GAPT, and a duration, GAPD, for the measurement interval, during which measurement interval reception of information from the second RAN can be performed, calculating a first mapping of GAPT and GAPD onto a first interval said first interval starting at zero and having a duration of T2 time units, calculating, based on the first mapping, an interval DTME1 that is not overlapping with a previously recorded DTME1, and if DTME1 is greater than zero:
recording DTME1,
receiving information from the second RAN during DTME1, and
storing the received information in a first measurement buffer;

repeating the mapping process until the aggregated recordings of DTME1 span the interval [0, T3], where T3 is T1 plus DTFS.

After this repeated mapping process, the FS is obtained from the first measurement buffer.

In a second aspect there is provided a method in a user equipment, UE. The UE is connected to a first radio access network, RAN and the method is for obtaining a block of information, FS, transmitted by a transmitter in a second RAN, to which second RAN the UE is not connected. The FS has a duration DTFS and is repeatedly transmitted every T1 time units and an idle block having a duration DTID is transmitted every T2 time units, where T2 is greater than T1. The method comprises a repeated mapping process of:

obtaining timing information for a measurement interval that specifies a point in time, GAPT, and a duration, GAPD, for the measurement interval, during which measurement interval reception of information from the second RAN can be performed, calculating a first mapping of GAPT and GAPD onto a first interval, said first interval starting at zero and having a duration of T2 time units, calculating a second mapping of GAPT and GAPD onto a second interval said second interval starting at zero and having a duration of T3 time units, where T3 is T1 plus DTFS, calculating, based on the second mapping, an interval DTME2 that is not overlapping with a previously recorded DTME2, and if DTME2 is greater than zero:
recording DTME2,
receiving information from the second RAN during DTME2, and storing the received information in a second measurement buffer;

calculating a third mapping of GAPT and GAPD onto a third interval said third interval starting at DTID and having a duration of T3 time units, where T3 is T1 plus DTFS, calculating, based on the third mapping, an interval DTME3 that is not overlapping with a previously recorded DTME3, and if DTME3 is greater than zero:

recording DTME3, receiving information from the second RAN during DTME3, and storing the received information in a third measurement buffer;

repeating the mapping processes until the aggregated recordings of DTME2 spans the second interval and until the aggregated recordings of DTME3 spans the third interval.

After this repeated mapping process, the FS is obtained from any of the second measurement buffer and the third measurement buffer.

In other words, these aspects provide an efficient way for a user equipment, camping on a cell of a first radio access technology, RAT, to perform measurements on the transmissions from a neighbouring radio cell of a different RAT.

Specifically, the recurrent time gaps that are available for making the measurements, i.e. the timing information that is obtained in the obtaining step, are not correlated or synchronized with the recurrent times at which the desired information, i.e. the block of information, are transmitted by the transmitter in the second RAT. Therefore, a mapping is performed of the time gaps onto the interval at which the desired information is transmitted. The mapping continues until a time interval is covered that ensures that the information in the recurring desired block of information can be obtained. During the mapping of the measurement gaps, only those time intervals that have not already been covered by the mapping are used for obtaining the desired information. This is ensured by the step of recording non-overlapping parts of the mapped measurement gaps.

Moreover, with regard to the second aspect, the second mapping is an optimization of the first mapping, which exploits the periodicity of T1 in FS. Moreover, an extra complexity is introduced by a transmission in the second RAN of an idle block having a recurrence interval that is different than that of the recurrence interval of the desired information. Such transmission of an idle block introduces an ambiguity with respect to the mapping process that is dealt with by applying the third mapping processes in addition to the first and second mappings summarized above. A second and a third mapping process is used, one of which assumes that a transmission of an idle block has not occurred since the previous available measurement gap, and one of which assumes that a transmission of an idle block has occurred since the previous available measurement gap. As for the single mapping aspect summarized above, only those time intervals that have not already been covered by the mappings are used for obtaining the desired information. This is ensured by the steps of recording non-overlapping parts of the mapped measurement gaps.

The measurement gaps published, i.e. made available, in the cell of the first RAT is used efficiently for obtaining the desired information from the neighbouring cell(s) of the second RAT. A measurement gap is used only if it coincides with an unseen portion of the recurrence interval in which the desired information is transmitted by the second RAN and hence avoids using the same portion of the interval more than once which is a waste as the second RAN cell was not found there earlier. The search for a new cell can be aborted when a continuous interval in which the desired information is transmitted by the second RAN is seen and this is more efficient than using prior art solutions, such as the abort time specified in the specification of LTE.

Further aspects include apparatuses and a computer program product that, together with their technical effects and advantages, correspond to the above summarized first and second aspects.

BRIEF DESCRIPTION OF THE DRAWINGS

FIGS. 3 and 4 are flow charts of methods, FIG. 5 schematically illustrates a traffic and control frame structure in a GSM network, FIG. 6 schematically illustrates timing of measurement gaps in a LTE network, FIG. 7 schematically illustrates a first mapping process, FIG. 8 schematically illustrates a second and a third mapping process.

DETAILED DESCRIPTION

Figure 1:
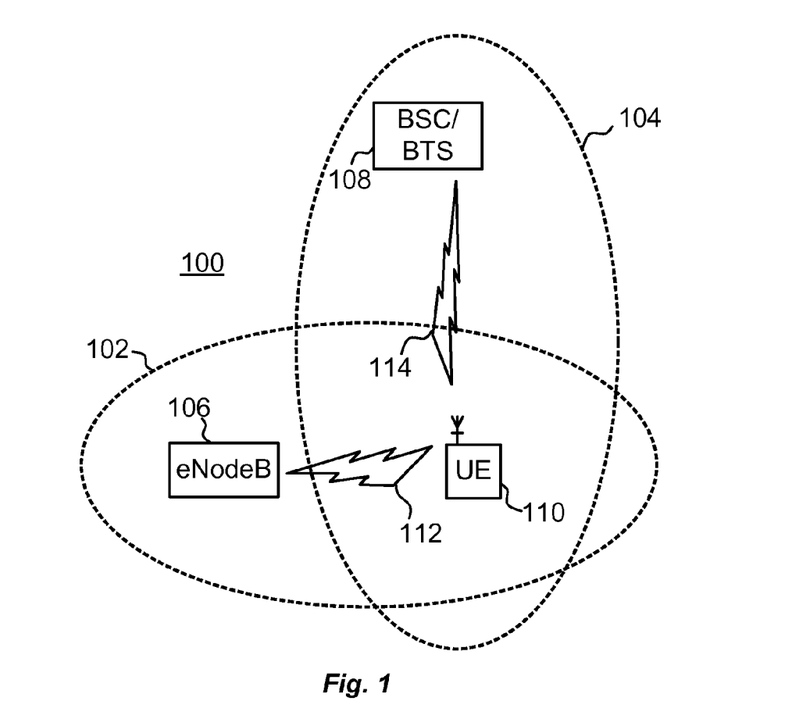
FIG. 1 schematically illustrates two radio access networks and a user equipment, FIG. 2 schematically illustrates a user equipment.

FIG. 1 illustrates a situation where a user equipment, UE, 110 is located such that it is capable of receiving radio signals from a first radio access network, RAN, in the form of a 3GPP LTE network and also capable of receiving radio signals from a second RAN in the form of a 3GPP GSM network. A LTE radio cell 102 is maintained by a first radio basestation, or eNodeB, 106 and a GSM radio cell 104 is maintained by a second radio base station 108. The UE 110 is connected to the first RAN and, as will be described in detail in the following, it is configured such that it desires to obtain information about the second cell 104 of the second RAN in order to enable a decision of whether or not to disconnect from the first RAN and continue connection with the second RAN. In other words, the UE 110 is in a situation where it is to decide whether or not to perform a so-called inter system handover between the two RANs.

As will be evident from the following detailed description, FIG. 1 will form the backdrop for the exemplifying embodiments. However, it is to be noted that, although FIG. 1 illustrates only a LTE RAN and a GSM RAN, the skilled person will be able to adapt and modify the methods to be described in order to practice them in situations involving other types of radio access networks, such as wideband code division multiple access, WCDMA, and time division synchronous code division multiple access, TD-SCDMA networks.

Figure 2:
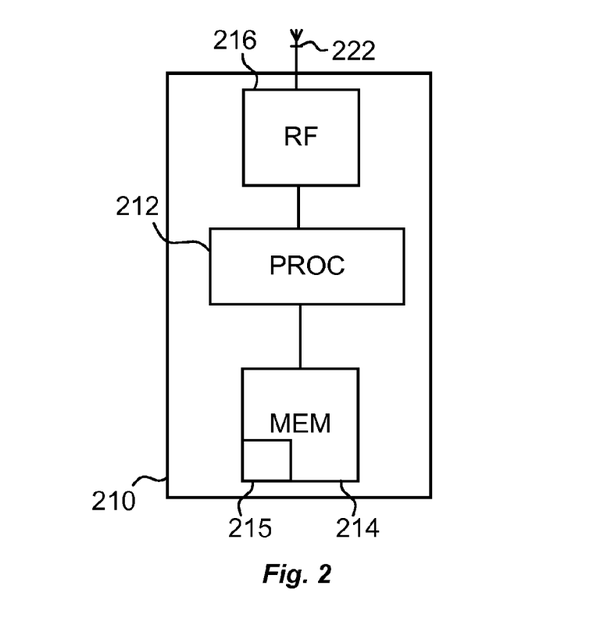

FIG. 2 is a block diagram that schematically illustrates a user equipment, UE, 210. The UE 210 can correspond to the terminal 110 in FIG. 1. The UE 210 comprises a processor 212, a memory 214, radio frequency, RF, receiving and transmitting circuitry 216 and an antenna 222. Radio communication via the antenna 222 is realized by the RF circuitry 216 controlled by the processor 212, as the skilled person will understand. The processor 212 makes use of software instructions 215 stored in the memory 214 in order to control all functions of the terminal 210, including the functions to be described in detail below with regard to obtaining measurements from a second RAN while being connected to a first RAN. In other words, at least the RF circuitry 216, the processor 212 and the memory 214 form parts of control and communication circuitry that is configured to obtaining measurements as summarized above and described in detail below. Further details regarding how these units operate in order to perform normal functions within a RAN, such as cells 102 and 104 of the respective the RANs in FIG. 1, are outside the scope of the present disclosure and are therefore not discussed further.

Figure 3:
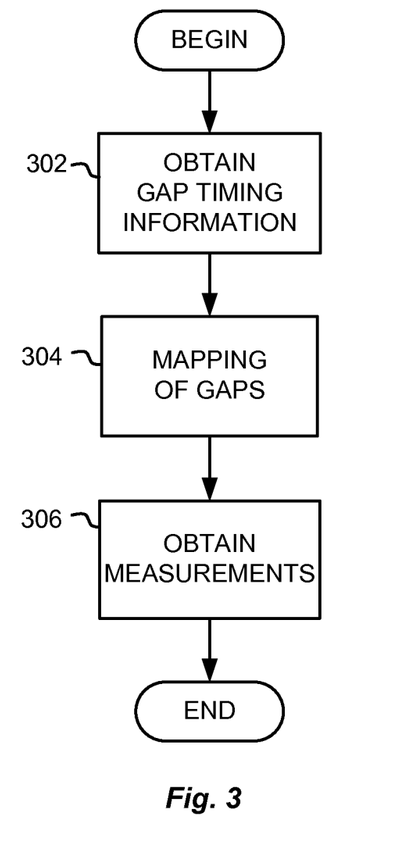
Figure 4:
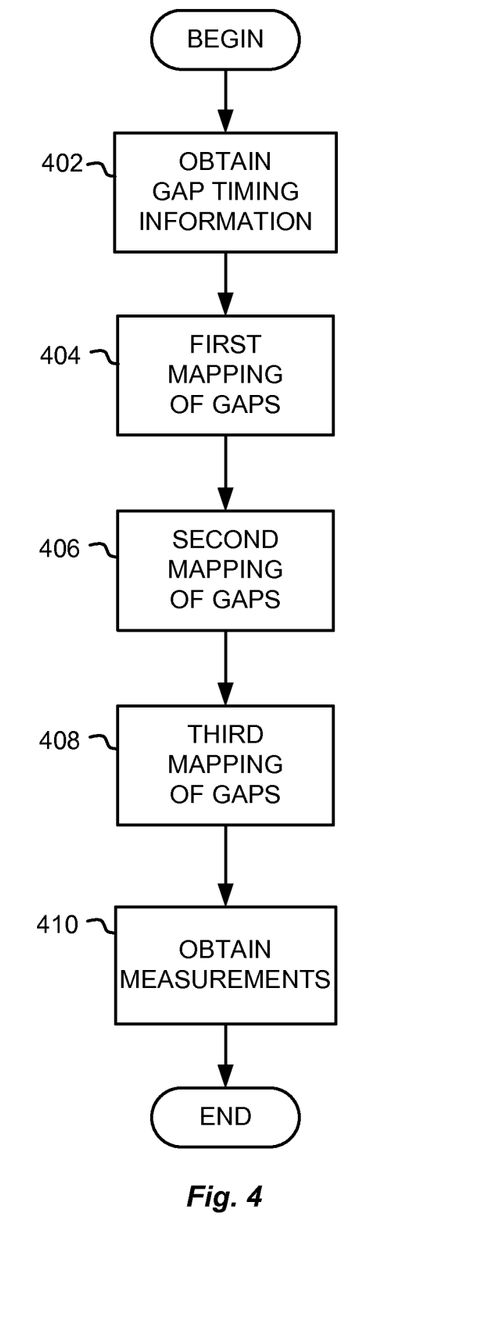

Turning now to FIGS. 3 and 4, and with continued reference to the previous figures, methods in a UE involving obtaining measurements from a second RAN while being connected to a first RAN will be described in some more detail.

FIG. 3 describes a method in a user equipment, UE. The UE is connected to a first radio access network, RAN and the method is for obtaining a block of information, FS, transmitted by a transmitter in a second RAN, to which second RAN the UE is not connected. The FS has a duration DTFS and is repeatedly transmitted every T1 time units and an idle block having a duration DTID is transmitted every T2 time units, where T2 is greater than T1. The method comprises a repeated mapping process of a number of steps. Timing information is obtained, in an obtaining step 302, for a measurement interval that specifies a point in time, GAPT, and a duration, GAPD, for the measurement interval, during which measurement interval reception of information from the second RAN can be performed. A mapping process is then performed, as represented by a mapping step 304. The mapping process comprises calculation of a first mapping of GAPT and GAPD onto a first interval said first interval starting at zero and having a duration of T2 time units. Based on the first mapping, an interval DTME1 is calculated that is not overlapping with a previously recorded DTME1. If DTME1 is greater than zero, DTME1 is recorded and information from the second RAN is received during DTME. The received information is stored in a first measurement buffer, whereupon the mapping process is repeated until the aggregated recordings of DTME1 span the interval [0, T3], where T3 is T1 plus DTFS. After this repeated mapping process, the FS is obtained, in an obtaining step 306, from the first measurement buffer.

FIG. 4 illustrates a method similar to the method in FIG. 3, further optimized with a second mapping to exploit the periodicity of T1 and with the added capability of handling an extra complexity that is introduced by a transmission in the second RAN of an idle block having a recurrence interval that is different than that of the recurrence interval of the desired information. As mentioned above, such transmission of an idle block introduces an ambiguity with respect to the mapping process that is dealt with by applying a third mapping processes in addition to the first and second mapping processes.

Hence, the method in FIG. 4 is a method in a user equipment, UE. The UE is connected to a first radio access network, RAN and the method is for obtaining a block of information, FS, transmitted by a transmitter in a second RAN, to which second RAN the UE is not connected. The FS has a duration DTFS and is repeatedly transmitted every T1 time units and an idle block having a duration DTID is transmitted every T2 time units, where T2 is greater than T1.

The method comprises a repeated mapping process of a number of steps.

Timing information is obtained, in an obtaining step 402, for a measurement interval that specifies a point in time, GAPT, and a duration, GAPD, for the measurement interval, during which measurement interval reception of information from the second RAN can be performed.

A first mapping process is then performed, as represented by a mapping step 404. The first mapping process comprises calculating a first mapping of GAPT and GAPD onto a first interval, said first interval starting at zero and having a duration of T2 time units.

A second mapping process is then performed, as represented by a second mapping step 406. The second mapping step 406 comprises calculation of a second mapping of GAPT and GAPD onto a second interval said second interval starting at zero and having a duration of T3 time units, where T3 is T1 plus DTFS. Based on the second mapping, an interval DTME2 is calculated that is not overlapping with a previously recorded DTME2. If DTME2 is greater than zero, DTME2 is recorded and information from the second RAN is received during DTME2. The received information is stored in a second measurement buffer.

A third mapping process is then performed, as represented by a third mapping step 408. The third mapping step 408 comprises calculating a third mapping of GAPT and GAPD onto a third interval said third interval starting at DTID and having a duration of T3 time units, where T3 is T1 plus DTFS. Based on the third mapping, an interval DTME3 is calculated that is not overlapping with a previously recorded DTME3. If DTME3 is greater than zero, DTME3 is recorded and information from the second RAN is received during DTME3. The received information is stored in a third measurement buffer.

The mapping processes are repeated until the aggregated recordings of DTME2 spans the second interval and until the aggregated recordings of DTME3 spans the third interval. After this repeated mapping process, the FS is obtained, in an obtaining step 410, from any of the second measurement buffer and the third measurement buffer.

In some embodiments, the obtaining of timing information for a measurement interval in the obtaining steps 302, 402 can comprise receiving the timing information from the first RAN.

In some embodiments, the obtaining of the FS in the obtaining steps 306, 410 can comprise obtaining an identifier associated with the transmitter in the second RAN.

In some embodiments, the first RAN is a 3GPP LTE, network and the second RAN is a GSM network, and the FS comprises information regarding an identity of a GSM base station transmitting in the second RAN. In such embodiments, the obtaining of timing information for a measurement interval can comprise obtaining timing information for a discontinuous reception, DRX, mode and a non-DRX mode.

In some embodiments, the first RAN is a 3GPP WCDMA, network and the second RAN is a GSM network, and the FS comprises information regarding an identity of a GSM base station transmitting in the second RAN. In such embodiments, the obtaining of timing information for a measurement interval can comprise receiving the timing information from the WCDMA network.

In some embodiments, the first RAN is a TD-SCDMA, network and the second RAN is a GSM network, and the FS comprises information regarding an identity of a GSM base station transmitting in the second RAN. In such embodiments, the obtaining of timing information for a measurement interval can comprise receiving the timing information from the TD-SCDMA network.

Turning now to FIGS. 5 to 9, embodiments involving a first RAN in the form of a 3GPP LTE network and a second RAN in the form of a GSM network will be described. As such, these embodiments will be based on the following timing data:

T1 is 10 GSM TDMA, frames,
DTFS is 1 GSM TDMA frame plus 1 GSM time slot,
T2 is 51 GSM TDMA frames,
DTID is 1 GSM TDMA frame,
GAPD is 6 milliseconds, and, in case the UE is in a non-discontinuous transmission mode, non-DRX, or in a non-DRX mode,
GAPT is an integer multiple of any of 40 milliseconds and 80 milliseconds.

In short, the embodiments to be described will illustrate measurement gaps that are used for searching for and obtaining a radio base station identification code, BSIC. It will be exemplified how to effectively "see" 12 continuous frames (96 slots=55.4 millisecond) of the GSM 51-control frame structure (e.g. as described in 3GPP TS 45.002. The gaps published by an LTE cell, i.e. the gaps available to obtain the GSM BSIC, are 6 milliseconds wide and can be 40 or 80 milliseconds apart in case the UE operates in a non DRX mode. In cases where the UE operates in DRX mode, the gaps are still 6 milliseconds wide but can be much sparser. For every gap which is utilized for BSIC Identification, it is marked (i.e. recorded) as seen on a 51 TDMA GSM control frame. The search for the new cell is continued till we see 12 continuous frames. Also if a gap provided is already marked as seen then this can be used for some other purpose thus avoiding duplication or ineffective usage of measurement gaps.

Figure 5:
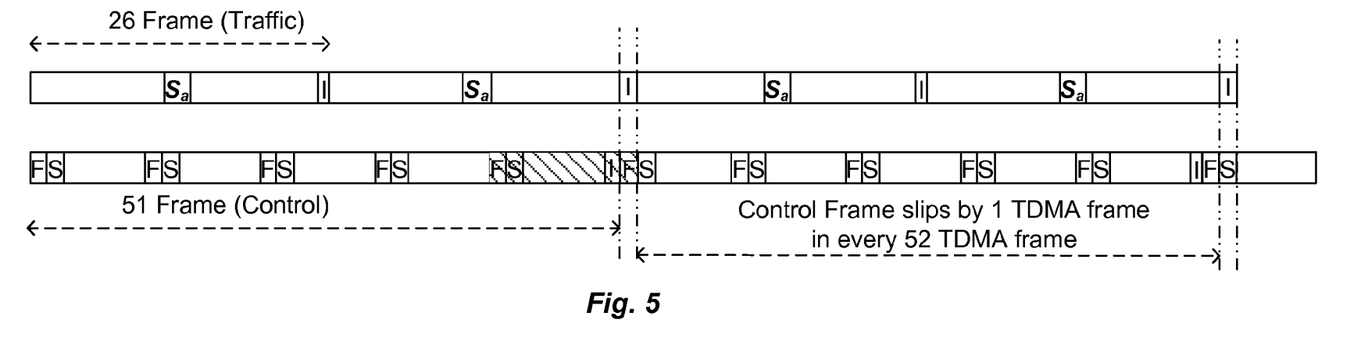

The GSM 26-frame traffic and 51-frame control is shown in FIG. 5. In the 51-frame control structure also it can be seen that the frequency correction channel, FCH, (denoted F) and the synchronization channel, SCH (denoted S) frames repeat after every $10^{th}$ frame and there is an IDLE (I) frame at the $51^{st}$ frame. It is to be noted that the FCH and SCH channels occur in the first slot of the respective TDMA frames, while the IDLE frame is for the full TDMA frame duration. So if a continuous time period of 11 frames+1 slot are seen, at least one FCH slot will be seen (as highlighted by the hashed area in FIG. 5, simplified for better clarity in that 12 frames are hashed). That is, for detecting FCH a continuous 11 frames+1 slot needs to be seen. If FCH is found then SCH should be present in the subsequent frame. Since 26 and 51 are relative prime numbers, the control frame slips by 1 TDMA frame every 52-TDMA frames (or two 26-frame traffic structure). So if every alternate IDLE frames is seen 12 times then at least one FCH slot will be seen. This works well when the UE is camped on a GSM cell and is searching for other GSM cells.

Figure 6:
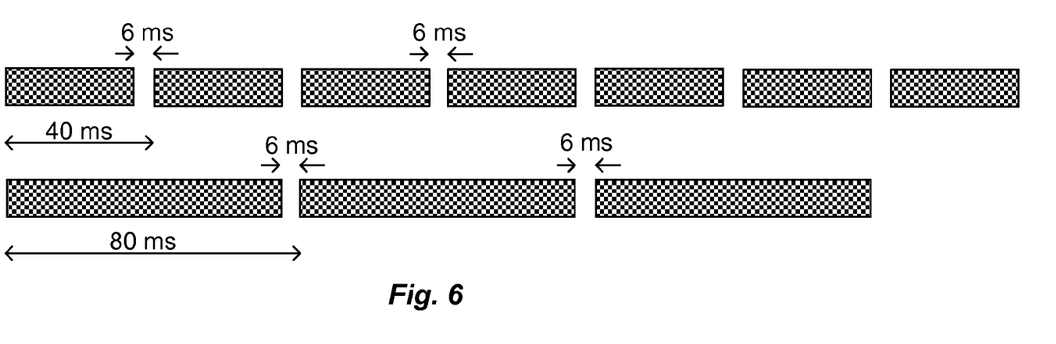

However, LTE cells provide measurement gap patterns which are 6 milliseconds wide and can be 40 or 80 milliseconds apart as shown in FIG. 6. These gaps are then used for measurements for all neighbour cells and it is not guaranteed that GSM measurements can get a continuous set of gaps for a predictable detection of new GSM cells. The GSM neighbour cell measurements include the following (as specified in 3GPP TS 45.002 and 3GPP 45.008):

1) Received signal strength indication, RSSI, measurements of all cells in the neighbour cell list (up to 32 neighbouring cells).
2) BSIC Reconfirmation (decoding SCH channel) of the top 8 neighbour cell whose timing is already known.
3) BSIC identification (decoding FCH and SCH) of a new cell in the top 8 list or determine the cell timing.

RSSI measurements can be done at any instant as it is only necessary to measure signal power on a channel and it is not necessary to decode anything. BSIC reconfirmation (SCH decoding) needs to be done at specific instances when they occur. So they can be done only when the measurement gaps provided align with the particular neighbour cell SCH. Since the timing of the cells are already known it is only necessary to check if the gaps are aligned with any of the top 8 neighbour's SCH before the gap is used to obtain data for the measurement. However a challenging task is to identify a new cell in the top 8 list (i.e. decode FCH), which needs a continuous period of 12 GSM frames of 55.4 milliseconds for a guaranteed detection. Since the gaps provided are much smaller and occur irregularly, it then becomes necessary to mark up the gaps against a 51-frame GSM structure to track what is already seen and use a gap if it has not yet been seen on the 51 frame structure. This enables an efficient usage of gaps so that deadlines for measurements can be met for all the neighbouring cells. This will be described in the following paragraphs.

Figure 7:
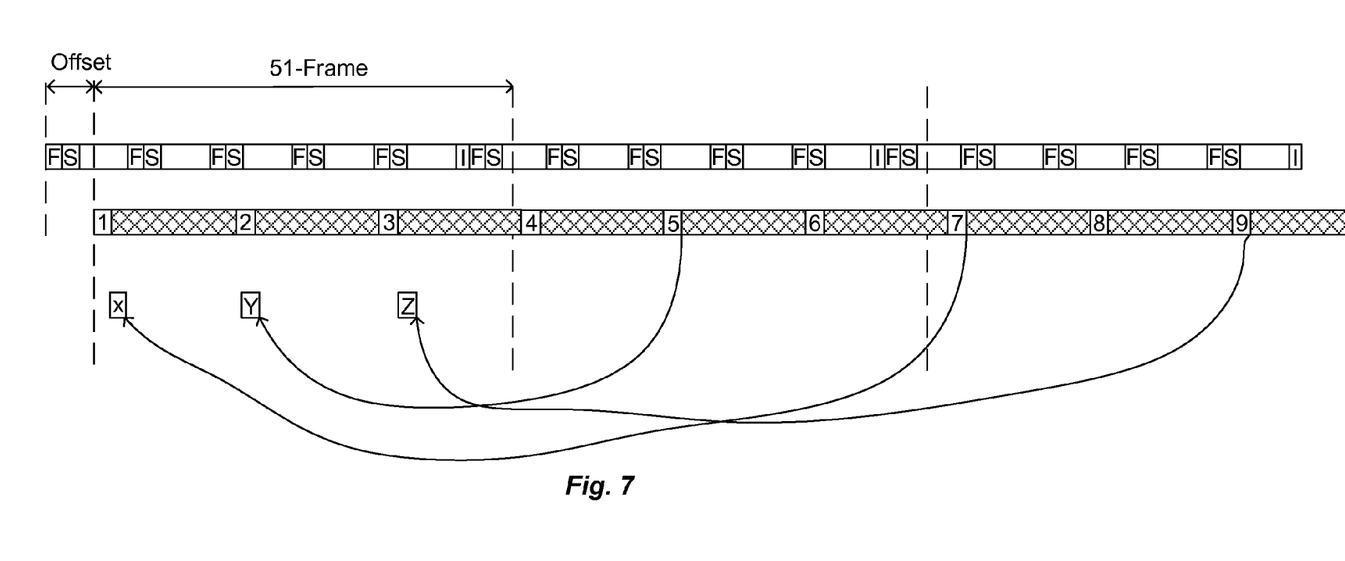

FIG. 7 shows the GSM 51 control frames against an 80 milliseconds gap pattern of LTE. It is to be noted that the GSM frame need not be aligned with the gap pattern; in the sense the first F frame may have an offset with the first gap used for F search. A mapping process is then performed where, as a first procedure, a notation is made of the time stamp of the first gap which is used for identification of the new cell. With reference to the time stamp of the first gap, the time stamp of every subsequent gap used for BSIC identification is marked modulo 51. As an illustration, seeing gap no 5 in the second 51 frame is same as seeing region Y in the first 51 multi-frame and seeing gap number 7 in the third multi-frame is same as seeing region X in the first multi-frame. If a continuous 12 frame region is seen covered within the 51 frame then it is ensured that at least one F is present. That is, 11 frames+1 slot for FCH and 12 frames+1 slot for FCH+SCH. However, for ease of illustration in FIG. 7, 12 frames are considered.

Figure 8:
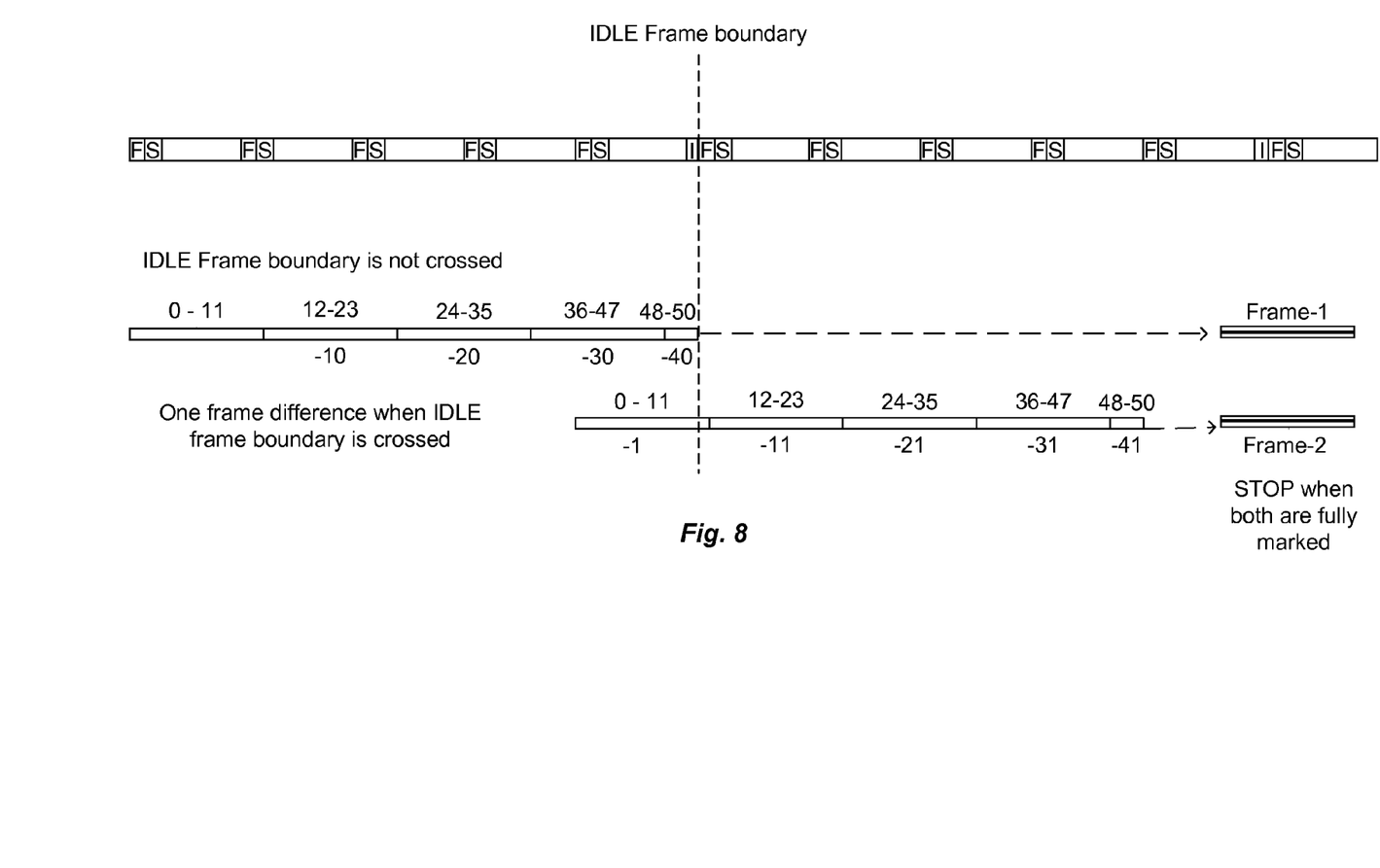
Figure 9A:
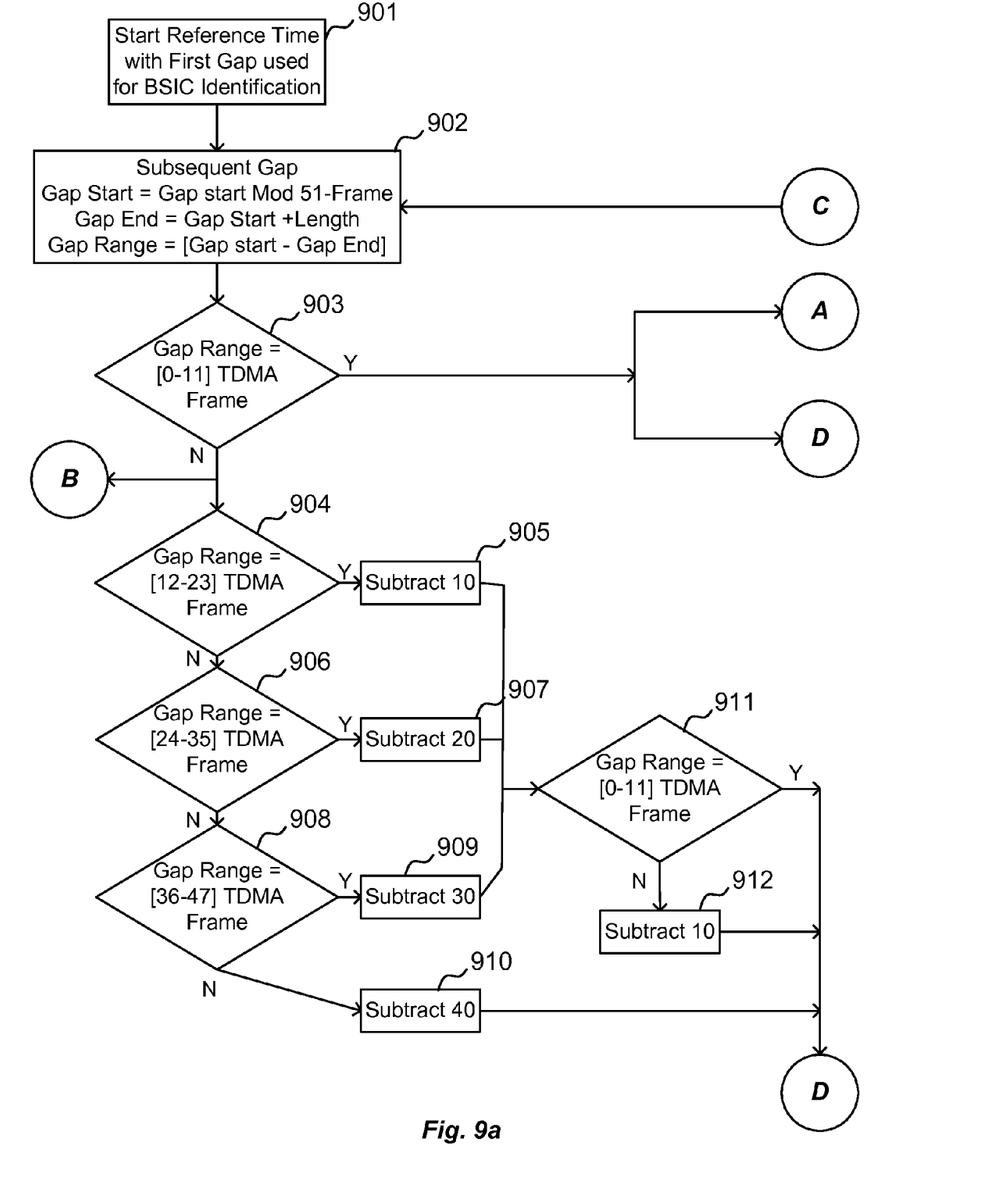
FIGS. 9a-d illustrate a flow chart of a method.
Figure 9B:
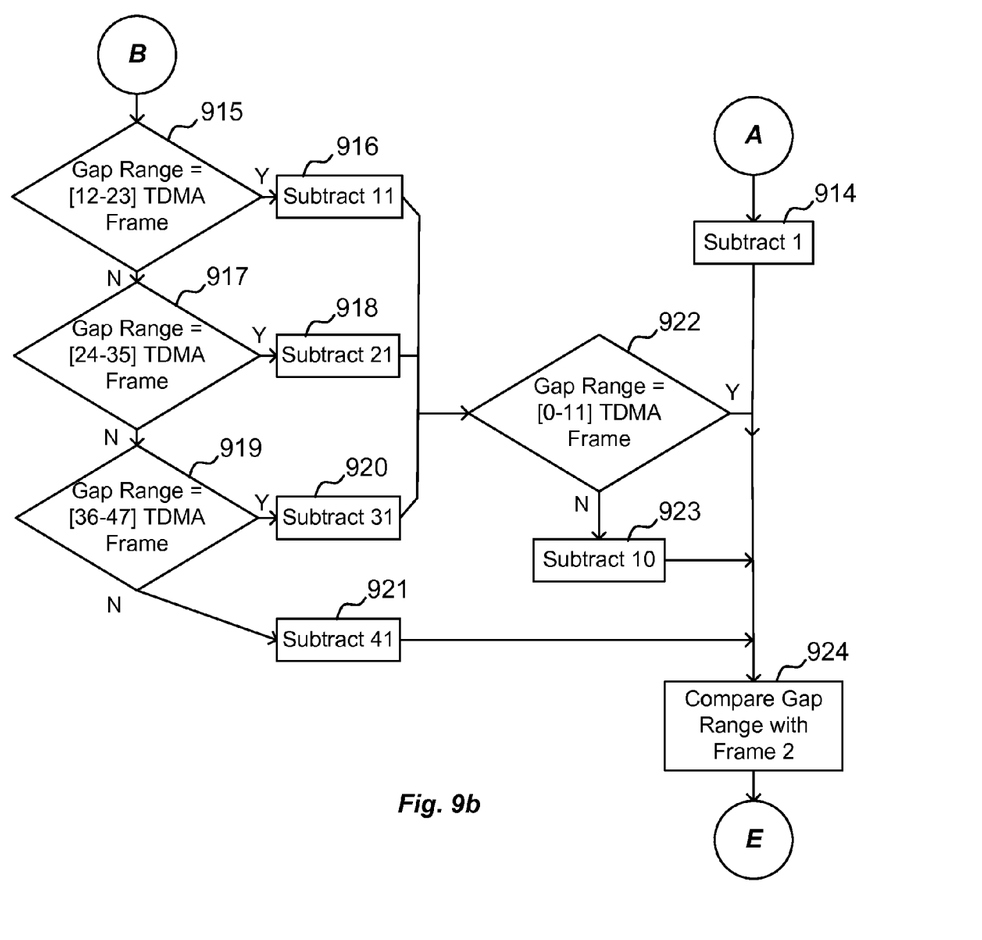
Figure 9C:
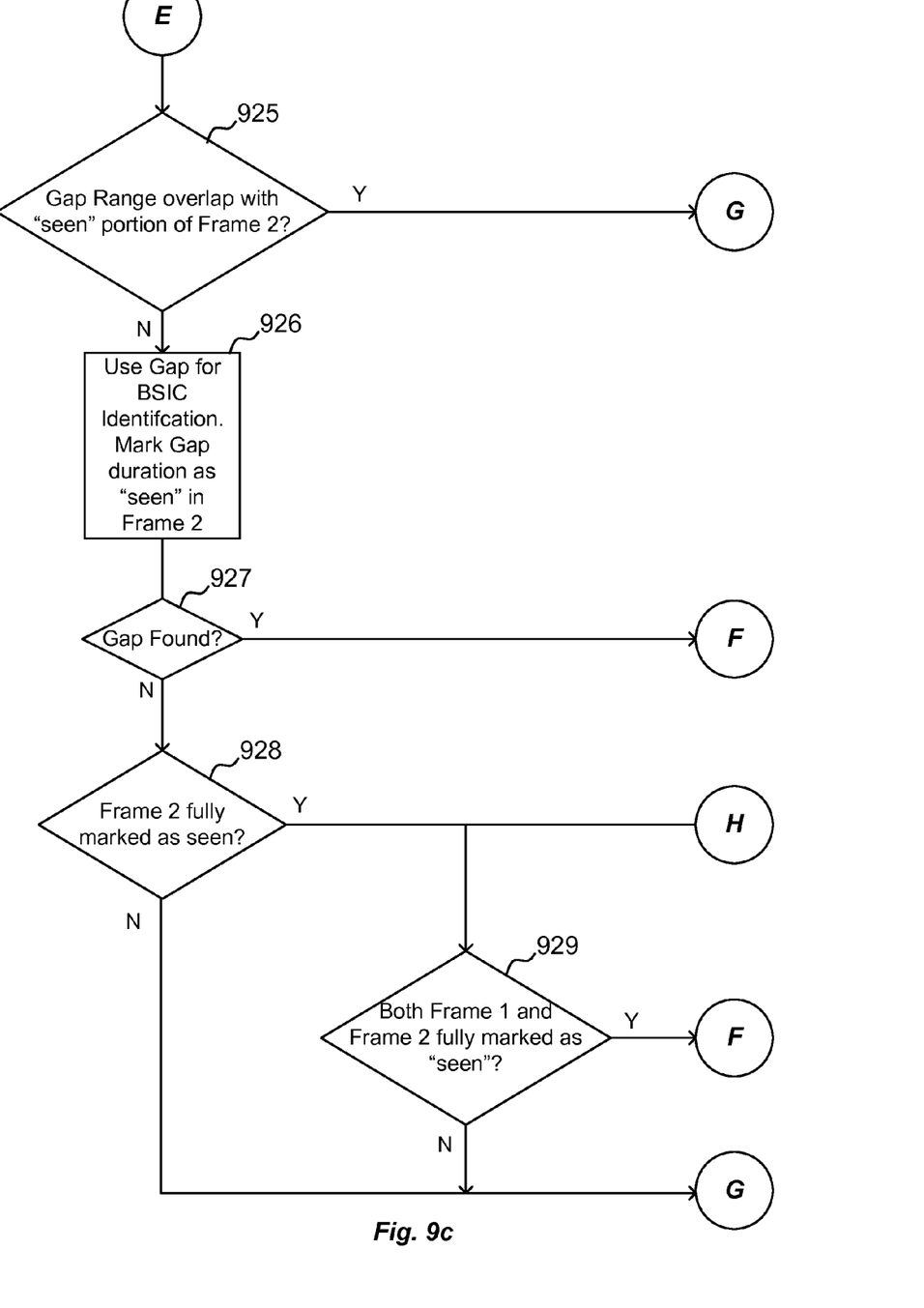
Figure 9D:
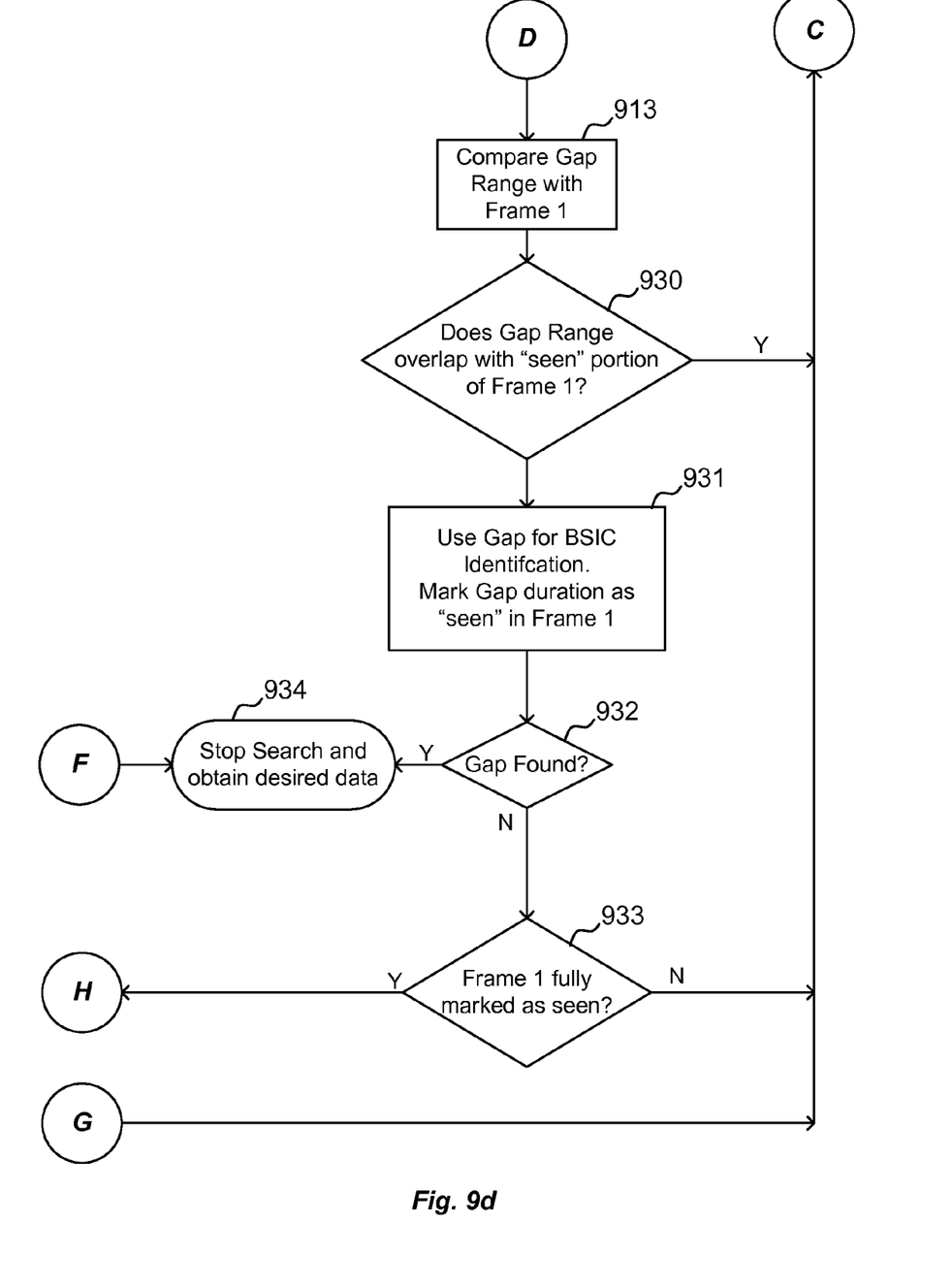

Searching for a continuous 12 frames within 51 frames can be a bit complex and more time consuming and hence a further optimization of the mapping can be performed as a second procedure as shown in FIG. 8. Such an optimization is basically exploiting the 10 frame periodicity of the F and S frames within the 51-control frame structure. As can be seen after the "first procedure" (as described above) the marked region can be anywhere in the range of "0-50 TDMA frame (or modulo 51)". In the "second procedure" it is further reduced to a "range of 0-11" using the following algorithm. The "second procedure" is basically performing "modulo 10 over a range of 12 frames". The number 10 is because the periodicity of F and S is 10 frames and number 12 is because it is desired to effectively see a continuous 12 frames of the 51 control frame structure. Now due to the IDLE frame at the end of 51-frame structure, the 10 frame periodicity is broken and there is an ambiguity of one frame when bringing it to range of 0-11, depending on whether the 51-frame boundary is crossed or not. To resolve this ambiguity, the second procedure has two parts. In one part it is assumed that the 51-frame boundary was not crossed and the frame is mapped to the range of 0-11. In the second part it is assumed that the 51-frame boundary was crossed and then the frame is mapped to the range of 0-11

When a measurement gap is made available, i.e. published, it is checked if the region is already seen by both methods. The logic of such a method, which implements a three stage mapping procedure as summarized above, is illustrated in the flow chart of FIG. 9 and the steps of the method are as follows.

Start marking the frames relative to the first gap (step 901 in FIG. 9).

Procedure 1 [Modulo-51]—i.e. a first mapping:

Every subsequent gap—convert time to frame number modulo 51 starting from first marked gap. That is, convert to time range [0-51] frames or 235.36 ms. (Step 902 in FIG. 9.)

Procedure 2 [Modulo 10 over 12 frames] (steps 903-912 and 914-923 in FIG. 9).

After doing the Modulo-51 mapping, do modulo 10 as a second and third mapping (steps 903-912 and 914-923 in FIG. 9).

To resolve ambiguity of IDLE frame, maintain modulo 10 for both cases

IF the frame number is [0-11]—Subtract 0/1 and mark frame 1/frame 2. That is, if the time range is [0-11] frames or [0-55.4] ms, subtract 0 or 4.615 ms. (Steps 903, 913, 930, 931 and 903, 914, 924-926 in FIG. 9.)

IF the frame number is [12-23]—Subtract 10/11. That is, if the time range is [12-23] frames or [55.4-110.8] ms, subtract 46.15 or 50.76 ms. (Steps 904, 905, 915, 916 in FIG. 9.)

IF the frame number>11 Subtract 10 and mark frame 1/frame 2. That is, if the time range is >55.4 ms, subtract 46.15 ms. (Steps 911, 912, 922, 923 in FIG. 9.)

IF the frame number is [24-35]—Subtract 20/21. That is, if the time range is [24-35] frames or [110.8-166.2] ms, subtract 92.3 or 96.91 ms. (Steps 906, 907, 917, 918 in FIG. 9.)

IF the frame number>11 Subtract 10 and mark frame 1/frame 2. That is, if the time range is >55.4 ms, subtract 46.15 ms. (Steps 911, 912, 922, 923 in FIG. 9.)

IF the frame number is [36-47]—Subtract 30/31. That is, if the time range is [36-47] frames or [166.2-221.6] ms, subtract 138.45 or 143.06 ms. (Steps 908, 909, 919, 920 in FIG. 9.)

IF the frame number>11 Subtract 10 and mark frame 1/frame 2. That is, if the time range is >55.4 ms, subtract 46.15 ms. (Steps 911, 912, 922, 923 in FIG. 9.)

IF the frame number is [48-50]—Subtract 40/41 and mark frame 1/frame 2. That is, if the time range is [48-50] frames or [221.6-235.36] ms, subtract 184.6 or 189.25 ms. (Steps 910, 921 in FIG. 9.)

Use a gap, i.e. record (e.g. in a buffer) information from the transmission by the second RAN, only when the gap is marked as unseen in either Frame-1 or Frame-2 or both (steps 925, 926, 930, 931 in FIG. 9).

STOP only when both frame-1 and frame-2 is fully marked as seen or the cell is found—whichever is earlier (steps 927, 928, 929, 932, 933, 934 in FIG. 9). At this point, the desired information can be read from the buffer.

After the first mapping, if, for example: the value is 22 (or 23), then after subtracting 10, the value still exceeds the range [0-11]. Hence, 10 is again subtracted. Note that for the second subtraction the value used is always 10 (basically performing modulo 10 operation) for marking both frame-1 and frame-2.

The invention claimed is:

1. A method in a user equipment, UE, connected to a first radio access network, RAN, for obtaining a block of information, FS, transmitted by a transmitter in a second RAN, to which second RAN the UE is not connected, wherein:

the FS has a duration DTFS and is repeatedly transmitted every T1 time units, an idle block having a duration DTID is transmitted every T2 time units, where T2 is greater than T1, the method comprising a repeated mapping process of:

obtaining timing information for a measurement interval that specifies a point in time, GAPT, and a duration, GAPD, for the measurement interval, during which measurement interval reception of information from the second RAN can be performed, calculating a first mapping of GAPT and GAPD onto a first interval said first interval starting at zero and having a duration of T2 time units, calculating, based on the first mapping, an interval DTME1 that is not overlapping with a previously recorded DTME1, and if DTME1 is greater than zero: recording DTME1, receiving information from the second RAN during DTME1, and storing the received information in a first measurement buffer to obtain aggregated recordings of DTME1;

repeating the mapping process until the aggregated recordings of DTME1 span an interval [0, T3], where T3 is T1 plus DTFS, and then:

obtaining the FS from the first measurement buffer.

2. The method of claim 1, wherein the obtaining of timing information for a measurement interval comprises receiving the timing information from the first RAN.

3. The method of claim 1, wherein the obtaining of the FS comprises obtaining an identifier associated with the transmitter in the second RAN.

4. The method of claim 1, wherein the first RAN is a 3rd generation partnership project, 3GPP, long term evolution, LTE, network and the second RAN is a global system for mobile communications, GSM, network, and the FS comprises information regarding an identity of a GSM base station transmitting in the second RAN.

5. The method of claim 4, wherein the obtaining of timing information for a measurement interval comprises obtaining timing information for a discontinuous reception, DRX, mode and a non-DRX mode.

6. The method of claim 1, wherein the first RAN is a 3rd generation partnership project, 3GPP, wideband code division multiple access, WCDMA, network and the second RAN is a global system for mobile communications, GSM, network, and the FS comprises information regarding an identity of a GSM base station transmitting in the second RAN.

7. The method of claim 6, wherein the obtaining of timing information for a measurement interval comprises receiving the timing information from the WCDMA network.

8. The method of claim 1, wherein the first RAN is a time division synchronous code division multiple access, TD-SCDMA, network and the second RAN is a global system for mobile communications, GSM, network, and the FS comprises information regarding an identity of a GSM base station transmitting in the second RAN.

9. The method of claim 8, wherein the obtaining of timing information for a measurement interval comprises receiving the timing information from the TD-SCDMA network.

10. The method of claim 4, wherein:

T1 is 10 GSM time division multiple access, TDMA, frames,

DTFS is 1 GSM TDMA frame plus 1 GSM time slot,

T2 is 51 GSM TDMA frames,

DTID is 1 GSM TDMA frame, and

GAPD is 6 milliseconds.

11. The method of claim 10, wherein:
GAPT is an integer multiple of any of 40 milliseconds and 80 milliseconds.

12. User equipment (UE) comprising:
radio frequency receiving and transmitting circuitry adapted to connect to a first radio access network, RAN;
a processor; and
a memory storing software instructions that, when executed by the processor, cause the processor to obtain a block of information, FS, transmitted by a transmitter in a second RAN, to which second RAN the UE is not connected, wherein:
the FS has a duration DTFS and is repeatedly transmitted every T1 time units,
an idle block having a duration DTID is transmitted every T2 time units, where T2 is greater than T1, and
the software instructions, when executed by the processor, cause the processor to obtain the block of information FS by:
obtaining timing information for a measurement interval that specifies a point in time, GAPT, and a duration, GAPD, for the measurement interval, during which measurement interval reception of information from the second RAN can be performed,
calculating a first mapping of GAPT and GAPD onto a first interval said first interval having a duration of T2 time units,
calculating, based on the first mapping, an interval DTME1 that is not overlapping with a previously recorded DTME1, and if DTME1 is greater than zero:
recording DTME1,
receiving information from the second RAN during DTME1, and
storing the received information in a first measurement buffer to obtain aggregated recordings of DTME1;
repeating the mapping process until the aggregated recordings of DTME1 span an interval [0, T3], where T3 is T1 plus DTFS, and then:
obtaining the FS from the first measurement buffer.

13. The UE of claim 12, wherein the software instructions, when executed by the processor, cause the processor to obtain timing information for a measurement interval by receiving the timing information from the first RAN.

14. The UE of claim 12, wherein the software instructions, when executed by the processor, cause the processor to obtain the FS by obtaining an identifier associated with the transmitter in the second RAN.

15. User equipment (UE) comprising:
radio frequency receiving and transmitting circuitry adapted to connect to a first radio access network, RAN;
a processor; and
a memory storing software instructions that, when executed by the processor, cause the processor to obtain a block of information, FS, transmitted by a transmitter in a second RAN, to which second RAN the UE is not connected, wherein:
the FS has a duration DTFS and is repeatedly transmitted every T1 time units,
an idle block having a duration DTID is transmitted every T2 time units, where T2 is greater than T1,
the software instructions, when executed by the processor, cause the processor to obtain the block of information FS by:
obtaining timing information for a measurement interval that specifies a point in time, GAPT, and a duration, GAPD, for the measurement interval, during which measurement interval reception of information from the second RAN can be performed,
calculating a first mapping of GAPT and GAPD onto a first interval, said first interval starting at zero and having a duration of T2 time units,
calculating a second mapping of GAPT and GAPD onto a second interval said second interval having a duration of T3 time units, where T3 is T1 plus DTFS,
calculating, based on the second mapping, an interval DTME2 that is not overlapping with a previously recorded DTME2, and if DTME2 is greater than zero:
recording DTME2,
receiving information from the second RAN during DTME2, and
storing the received information in a second measurement buffer, to obtain aggregated recordings of DTME2;
calculating a third mapping of GAPT and GAPD onto a third interval said third interval starting at DTID and having a duration of T3 time units, where T3 is T1 plus DTFS,
calculating, based on the third mapping, an interval DTME3 that is not overlapping with a previously recorded DTME3, and if DTME3 is greater than zero:
recording DTME3,
receiving information from the second RAN during DTME3, and
storing the received information in a third measurement buffer to obtain aggregated recordings of DTME3;
repeating the mapping processes until the aggregated recordings of DTME2 spans the second interval and until the aggregated recordings of DTME3 spans the third interval, and then:
obtaining the FS from any of the second measurement buffer and the third measurement buffer.

16. The UE of claim 15, wherein the first RAN is a 3rd generation partnership project, 3GPP, long term evolution, LTE, network and the second RAN is a global system for mobile communications, GSM, network, and the FS comprises information regarding an identity of a GSM base station transmitting in the second RAN.

17. The UE of claim 16, wherein the obtaining of timing information for a measurement interval comprises obtaining timing information for a discontinuous reception, DRX, mode and a non-DRX mode.

18. The UE of claim 16, wherein:
T1 is 10 GSM time division multiple access, TDMA, frames,
DTFS is 1 GSM TDMA frame plus 1 GSM time slot,
T2 is 51 GSM TDMA frames,
DTID is 1 GSM TDMA frame, and
GAPD is 6 milliseconds.

19. The UE of claim 18, wherein:
GAPT is an integer multiple of any of 40 milliseconds and 80 milliseconds.

\* \* \* \* \*